United States Patent

[11] 3,593,525

| [72] | Inventor | Allen B. Holmes |
| | | Rockville, Md. |
| [21] | Appl. No. | 800,652 |
| [22] | Filed | Feb. 19, 1969 |
| [45] | Patented | July 20, 1971 |
| [73] | Assignee | The United States of America as represented by the Secretary of the Army |

[54] ROCKET MOTOR THRUST CONTROLLER
4 Claims, 4 Drawing Figs.

[52] U.S. Cl. ................................................. 60/254, 60/264, 239/127.3
[51] Int. Cl. ................................................. F02k 9/04
[50] Field of Search ................................................. 60/39.23, 253—256, 261, 264; 239/127.3

[56] References Cited
UNITED STATES PATENTS

| 3,469,787 | 9/1969 | Marsh | 60/264 |
| 1,103,503 | 7/1914 | Goddard | 60/G-DIG. |
| 1,375,601 | 4/1921 | Morize | 60/264 |
| 1,733,792 | 10/1929 | Good | 60/39.23 |
| 2,486,019 | 10/1949 | Goddard | 60/264 X |
| 2,648,192 | 8/1953 | Lee | 60/264 X |
| 2,671,313 | 3/1954 | Laramee | 60/264 X |
| 3,095,694 | 7/1963 | Walter | 60/264 X |
| 3,117,418 | 1/1964 | McCoy et al. | 60/39.14 |

FOREIGN PATENTS

| 157,781 | 1/1921 | Great Britain | 60/264 |

Primary Examiner—Douglas Hart
Attorneys—Harry M. Saragovitz, Edward J. Kelly, Herbert Berl and J. D. Edgerton ABSTRACT: A rocket motor thrust controller having a hollow cylindrical rocket motor casing for containing solid propellant therein with a nozzle formed at one end thereof for providing an exhaust passage for combustion products, an elongated open ended hollow tubular member axially aligned with the rocket motor casing and in open communication with the nozzle, an apertured cylindrical member enveloping the nozzle and one open end of the tubular member for inducing secondary air flow to the exhaust gases, and an apertured cylindrical sleeve movably mounted about the cylindrical member for varying the aperture openings and the amount of secondary airflow. By reducing the amount of secondary air flow, it is possible to reduce the final value of thrust by over a factor of two because of the combined effect of the mass reduction and velocity losses within the hollow tubular member.

PATENTED JUL 20 1971        3,593,525
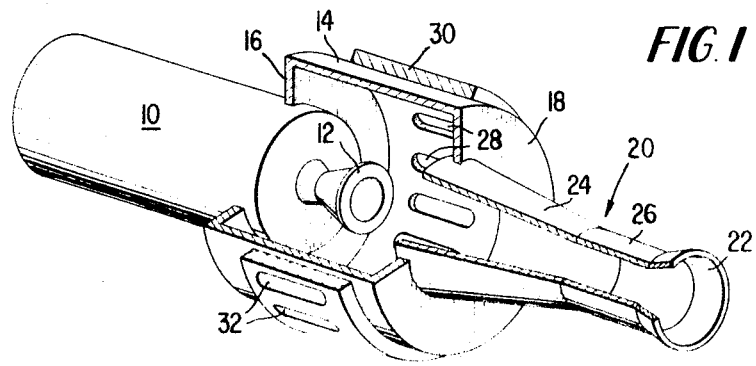
FIG. 1
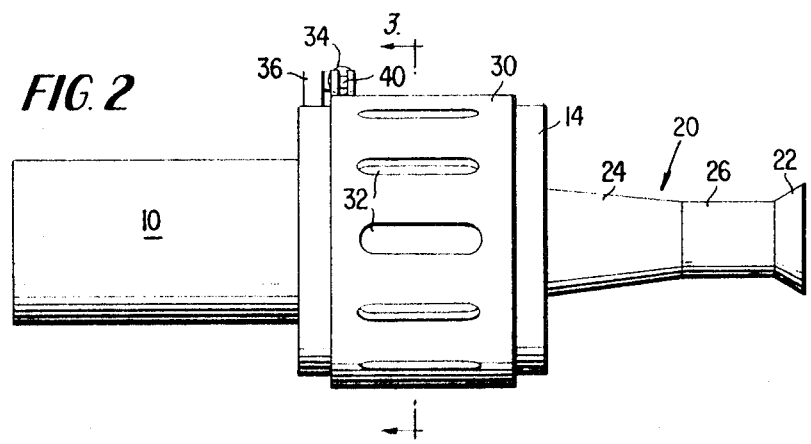
FIG. 2
FIG. 3
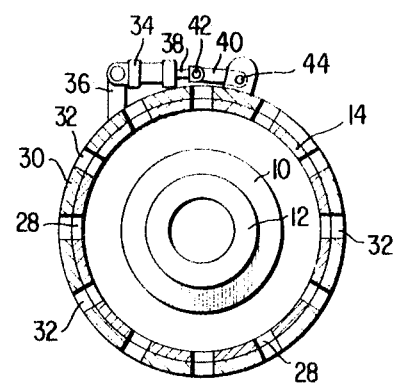
FIG. 4
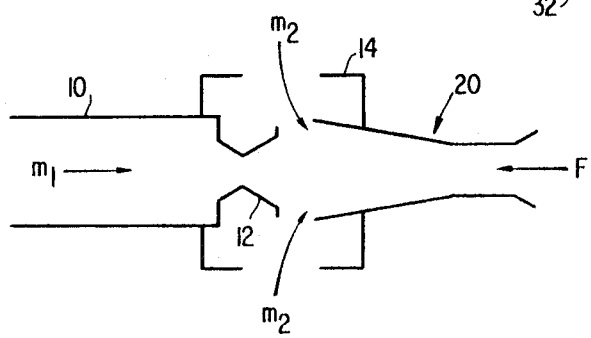
INVENTOR
ALLEN B. HOLMES
BY Harry M. Saragovitz, Edward J. Kelly,
Herbert Berl, and JD Edgerton
ATTORNEYS

ROCKET MOTOR THRUST CONTROLLER

BACKGROUND OF THE INVENTION

The present invention relates generally to rocket motors and more particularly to a variable-thrust solid-propellant rocket motor.

Increased experimentation, development and usage of rockets for scientific and military purposes has created a demand for the ability to modulate the thrust of a rocket nozzle under constant propellant flow conditions. The wide variety of missions presently associated with rockets has made apparent the need for versatility in engine performance. Of particular importance in this respect is the capability of axial thrust control. For example, vernier control of thrust magnitude could be used to match vehicle drag forces with propulsion forces to produce a vacuum trajectory. Many of the current problems associated with thrust modulation have to do with materials, combustion instabilities, and the complexity of current systems.

One conventional approach to axial thrust control has been the use of pintle nozzles to vary engine flow rate. Another conventional approach has been symmetric throat injection to vary the magnitude of the nozzle flow. Both of these systems have been somewhat successful, although they have created highly undesirable problems, since they are complicated in structure and require auxiliary power and high temperature materials.

SUMMARY OF THE INVENTION

Accordingly, one object of this invention is to provide a new and improved rocket motor thrust controller which is simple in structure, relatively inexpensive, easily installed and operated, and highly effective.

Another object of this invention is the provision of a new and improved thrust controller for a solid propellant rocket motor.

A further object of the instant invention is to provide a new and improved rocket motor thrust controller which is capable of modulating the thrust of a rocket nozzle under constant propellant flow conditions.

A still further object of this invention is the provision of a new and improved thrust controller for a rocket motor which is capable of modulating rocket thrust by entraining secondary flow of ambient air into the exhaust of the rocket nozzle.

Still another object of the invention is to provide a new and improved rocket motor thrust controller which has the capability of varying the mass flow from a rocket motor having a rocket nozzle operating under constant propellant flow conditions.

Briefly, in accordance with one embodiment of this invention, these and other objects are obtained by providing a rocket engine having a hollow cylindrical casing for containing a propellant therein and having a nozzle at one end thereof, a tubular open ended member in axial alignment with the casing and having one end thereof in open communication with the nozzle for receiving exhaust gases therefrom, an apertured cylindrical member enveloping the nozzle and one end of the tubular member for providing secondary airflow to the exhaust gases, and an apertured sleeve encircling the cylindrical member for varying the secondary airflow.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein:

FIG. 1 is a perspective view with parts broken away illustrating the thrust controller of the present invention associated with the exhaust nozzle of rocket motor;

FIG. 2 is a side plan view of the mechanism of FIG. 1;

FIG. 3 is a sectional view taken along the line 3-3 of FIG. 2; and

FIG. 4 is a schematic view showing the mass flow through the rocket motor of the present invention.

DESCRIPTION OF THE PREFERRED EMBODIMENT

The present invention utilizes a secondary flow of ambient air entrained into the exhaust of the rocket nozzle and ejected with the nozzle flow through a diffuser to modulate the thrust of a rocket nozzle under constant propellant flow conditions. Since thrust force is directly proportional to the product of the mass flow and exhaust velocity, any change in these quantities implies a change in thrust. The controller operates on a mass-velocity principle wherein the engine exhaust gases expand through a divergent nozzle, converting the pressure of the gases into kinetic energy, at which point the gases are directed through ambient air into a diffuser and finally exhausted through a nozzle to atmosphere. As the stream passes through the ambient air it entrains a definite mass of air into the diffuser thus imparting to this mass a portion of its own energy and transmitting this mass through the output nozzle at a pressure greater than ambient. The final reaction forces are eventually equal to the sum of the propellant's mass flow and the entrainment flow times the exhaust velocity as given by the following equation:

$$(m_1 + m_2) V = F$$

where $m_1$ equals engine flow, $m_2$ equals entrainment flow and $V$ equals exhaust flow velocity. By reducing the value of entrainment flow $m_2$, it is possible to reduce the final value of force $F$ by over a factor of two because of the combined effect of the mass reduction and velocity losses in the diffuser. These losses can be described as frictional velocity losses that occur as a result of complex shock wave interactions and boundary effects.

Referring now to the drawings wherein like reference characters designate like parts throughout the several views and more particularly to FIG. 1 thereof, the numeral 10 designates the hollow cylindrical casing for containing propellant therein. Although the casing 10 may contain any conventional solid or liquid propellants, the subject invention has found greatest success with the utilization of solid propellants wherein thrust modulation has been difficult if not impossible in the past. Extending from the aft end of the casing 10 is a conventional nozzle 12 through which the exhaust gases from the products of combustion of the propellant in casing 10 are expelled. With conventional rocket motors, particularly those utilizing solid propellants, the propellants mass flow rate is virtually constant, such that the thrust at the nozzle 12 is uncontrolled.

A cylindrical member 14 is secured to the rocket casing 10 by means of a first closed end plate 16, such that member 14 envelopes the nozzle 12. End plate 16 may be affixed to the rocket casing 10 by any conventional means, such as welding. Extending from a second closed end plate 18 of cylindrical member 14 is a hollow tubular member 20 secured in axial alignment with nozzle 12 and in open communication therewith. The tubular diffuser 20 has a thruster nozzle 22 formed on the outer terminal portion thereof, such that the internal shape of the diffuser 20 has a first convergent section 24 adjacent nozzle 12, a second constant area section 26 and a third divergent exhaust section 22.

A plurality of symmetrically arranged apertures 28 are located about the periphery of cylindrical member 14 for providing secondary flow of ambient air to the exhaust gases emitted from nozzle 12 prior to entering diffuser 20. A cylindrical sleeve 30 encircles cylindrical member 14 and has a plurality of aperture 32 symmetrically arranged thereabout in alignment with the apertures 28 in cylindrical member 14. By rotating sleeve 30 about cylindrical member 14 the apertures 32 and 28 may be brought into and out of alignment, such that the amount of secondary ambient air flow induced into the mass flow of exhaust gases from nozzle 12 may be varied.

Referring now to FIGS. 2 and 3, it is seen that a standard cylinder piston actuator member 34 is secured to cylindrical member 14 by means of a convention mount 36. Extending outwardly from the cylinder piston 34 and fixedly attached to the piston therein is an operator rod 38 which is operatively connected to cylindrical sleeve 30 by means of a conventional linkage 40 having link pins 42 and 44. When it is desired to vary the amount of secondary airflow into the exhaust gases of nozzle 12, a signal is provided to cylinder piston operator 34 by any conventional means (not shown), such that the sleeve 30 will rotate about cylindrical member 14 to align or misalign apertures 28 and 32. When in the fully aligned position, as shown in FIG. 3, apertures 28 and 32 will admit maximum secondary airflow to the exhaust gases, thus augmenting the thrust of the rocket motor to substantially the value of thrust issuing from nozzle 12 without the device of the present invention. When in the fully closed position, with no secondary airflow, the overall thrust of the rocket motor is decreased by over 50 percent.

As shown in FIG. 4, the mass flow of exhaust gases $m_1$ from the engine combines with the entrained flow of secondary air $m_2$ to be exhausted through diffuser 20. The final reaction forces on the rocket motor are eventually equal to the sum of the propellant mass flow and the entrainment flow times the exhaust velocity as given by the following equation:

$$(m_1+m_2) V=F$$

As previously stated, by misaligning apertures 28 and 32 the value of entrained flow $m_2$ will be reduced, thus, reducing the final value of thrust force $F$ by over a factor of two because of the combined effect of the mass reduction and velocity losses in the diffuser.

Obviously, numerous modifications and variations of the present invention are possible in the light of the above teachings. It is, therefore, to be understood that within the scope of the appended claims the invention may be practiced otherwise than is specifically described herein.

What I claim is new and desire to be secured by Letters Patent of the United States is:

1. A rocket engine comprising:
    a hollow cylindrical casing for containing a propellant therein and having a nozzle at one end thereof,
    a solid propellant within said casing for producing rocket thrust by exhausting combustion products through said nozzle,
    means for controlling said thrust issuing from said nozzle by reducing said thrust from the maximum available by a factor of two, said control means including:
    a tubular open ended member in axial alignment with said casing and having one end thereof in direct open communication with said nozzle for receiving exhaust gases therefrom,
    means enveloping said nozzle and said one end of said tubular member for providing secondary airflow to said exhaust gases, and
    means for varying said secondary airflow.

2. A rocket engine according to claim 1, wherein said enveloping means comprises
    a cylindrical member encircling said nozzle and said one end of said tubular member and having a plurality of apertures therein,
    a first closed end plate interconnecting said cylindrical member and said nozzle, and
    a second closed end plate interconnecting said cylindrical member and said one end of said tubular member,
    whereby secondary airflow is induced through said apertures into said exhaust gases.

3. A rocket engine according to claim 2, wherein said means for varying said secondary airflow comprises
    a cylindrical sleeve encircling said cylindrical member and having a plurality of apertures therein aligned with said apertures in said cylindrical member, and
    means for aligning and misaligning said apertures in said cylindrical member and said cylindrical sleeve such that the effective cross section of said apertures is variable.

4. A rocket engine according to claim 3, wherein said means for aligning and misaligning said apertures comprises
    a piston-type actuator, and
    a linkage interconnecting said actuator and said sleeve for rotating said sleeve relative to said cylindrical member in response to movement of said piston.